United States Patent
Cachod

(10) Patent No.: US 7,431,308 B2
(45) Date of Patent: Oct. 7, 2008

(54) TOOL-HOLDING CHUCK FOR EQUIPPING A ROTATING MACHINE, PROVIDED WITH SEQUENCED RADIAL AND AXIAL LOCKING MEANS

(75) Inventor: Yves Marie Marcel Cachod, Levier (FR)

(73) Assignee: Etablissements Amyot S.A., Pontarlier (FR)

( * ) Notice: Subject to any disclaimer, the term of this patent is extended or adjusted under 35 U.S.C. 154(b) by 35 days.

(21) Appl. No.: 11/476,685

(22) Filed: Jun. 29, 2006

(65) Prior Publication Data

US 2007/0200303 A1 Aug. 30, 2007

(30) Foreign Application Priority Data

Feb. 27, 2006 (FR) .................................. 06.01697

(51) Int. Cl.
*B23B 31/107* (2006.01)
(52) U.S. Cl. ..................... 279/62; 279/125; 279/140
(58) Field of Classification Search ............. 279/60–62, 279/125, 140
See application file for complete search history.

(56) References Cited

U.S. PATENT DOCUMENTS

| | | | |
|---|---|---|---|
| 4,563,013 A | 1/1986 | Hunger et al. | |
| 4,682,918 A | 7/1987 | Palm | |
| 4,695,066 A * | 9/1987 | Rohm | 279/62 |
| 4,955,623 A * | 9/1990 | Rohm | 279/60 |
| 4,958,840 A | 9/1990 | Palm | |
| 5,375,857 A | 12/1994 | Rohm | |
| 5,458,345 A | 10/1995 | Amyot | |
| 5,624,125 A * | 4/1997 | Rohm | 279/62 |
| 5,741,016 A | 4/1998 | Barton et al. | |
| 5,765,839 A * | 6/1998 | Rohm | 279/62 |
| 5,816,582 A | 10/1998 | Steadings et al. | |
| 5,957,469 A | 9/1999 | Miles et al. | |
| 6,073,939 A | 6/2000 | Steadings et al. | |
| 6,179,301 B1 | 1/2001 | Steadings et al. | |
| 6,302,407 B1 * | 10/2001 | Hsueh | 279/62 |
| 6,341,783 B1 | 1/2002 | Rohm | |
| 6,390,481 B1 * | 5/2002 | Nakamuro | 279/62 |
| 6,435,521 B2 | 8/2002 | Steadings et al. | |
| 6,533,291 B2 | 3/2003 | Huggins et al. | |
| 6,581,942 B2 | 6/2003 | Rohm | |
| 6,824,141 B1 * | 11/2004 | Sakamaki et al. | 279/62 |
| 6,832,764 B2 | 12/2004 | Steadings et al. | |
| 6,959,931 B2 * | 11/2005 | Sakamaki et al. | 29/436 |
| 7,178,216 B2 * | 2/2007 | Sakamaki et al. | 279/62 |
| 7,185,895 B2 * | 3/2007 | Cachod et al. | 279/62 |
| 7,185,896 B2 * | 3/2007 | Cachod et al. | 279/62 |
| 2001/0042965 A1 | 11/2001 | Gaddis et al. | |
| 2002/0000698 A1 | 1/2002 | Rohm | |
| 2002/0041072 A1 | 4/2002 | Wilson | |
| 2004/0135325 A1 | 7/2004 | Cachod et al. | |
| 2006/0038359 A1 | 2/2006 | Luckenbaugh et al. | |
| 2006/0066063 A1 | 3/2006 | Nickels, Jr. et al. | |

* cited by examiner

*Primary Examiner*—Daniel W. Howell
*Assistant Examiner*—Eric A. Gates
(74) *Attorney, Agent, or Firm*—Oliff & Berridge, PLC

(57) ABSTRACT

Sliding in the body of the chuck are jaws whose external thread is engaged with the internal thread of a nut mounted to rotate on the body. The nut is rotated by a sleeve, allowing the jaws to move. The chuck includes radial locking device which can be actuated by a rotation of the sleeve so as to inhibit rotation of the nut with respect to the body, and axial locking device which can be actuated by an axial movement of the sleeve and make it possible to prevent the radial locking device from being actuated. Sequencing device is designed to prevent the axial locking device from passing into the locked position while the radial locking device is not in the locked position.

17 Claims, 6 Drawing Sheets

TOOL-HOLDING CHUCK FOR EQUIPPING A ROTATING MACHINE, PROVIDED WITH SEQUENCED RADIAL AND AXIAL LOCKING MEANS

BACKGROUND

The present invention relates to a tool-holding chuck for equipping a rotating machine, in particular a drill.

Conventionally, a chuck includes a body having an axis and including a rear part intended to be fixed to a driver shaft of the machine and a front part in which forward-converging housings are formed, jaws each mounted slidably in a housing of the body and having an external thread, a nut mounted to rotate on the body and having an internal thread engaged with the external thread of the jaws, and a sleeve having an inner wall which cooperates with the nut so as to rotate it with respect to the body and thus move the jaws between a tool-clamping position and a released position.

The advantage of chucks of this type is that they allow a tool to be clamped without requiring the use of a key, while at the same time avoiding untimely opening of the chuck, particularly during percussion work.

It is known practice to provide radial and/or axial locking means on such chucks.

Radial locking means make it possible to prevent the nut from rotating with respect to the body when the jaws are in the clamping position. They can be actuated automatically and in a manner which is transparent to the operator during the clamping and releasing phases of the chuck, for example using the same rotational movement of the sleeve about the body which enables the chuck to be clamped and released.

Axial locking means for their part, when in the locked position, are aimed at preventing the radial locking means from unlocking. Once the chuck has been locked radially, the operator is required to move the sleeve in the axial direction, generally from the front to the rear of the chuck, to achieve locking. In the same way, when opening the chuck, the operator is first required to move the sleeve in the axial direction, generally from the rear to the front of the chuck, to unlock the latter before being able to release the chuck radially.

To make total locking available, chucks may be equipped with two combined locking systems, one radial and one axial.

However, it is clearly apparent that these two locking systems must be employed in a specific order so that each of them can perform its task perfectly. The very principle of these systems demands that the radial locking system be triggered first and that the axial locking system be triggered in a second step.

In fact, if the axial locking system is triggered first, the radial locking system will be unable to be triggered since the sleeve will then be inhibited from rotating with respect to the body. Moreover, if the axial locking system is triggered first, that may result in damage to the axial locking system since the operator will seek to turn the sleeve to trigger the radial locking means even though the said sleeve will have already been immobilized rotationally.

Actuating the axial locking system first may also prove to be dangerous for the operator. Specifically, when the operator manoeuvres the chuck with the aid of the drill, particularly a cordless drill, if the axial locking system is triggered first, the sleeve will be automatically and abruptly inhibited from rotating with respect to the body of the chuck. Thus, the operator runs the risk of injuring his hand.

SUMMARY

The present invention aims to overcome the aforementioned disadvantages by providing a chuck fitted with axial and radial locking means which improve locking efficiency and ensure operator safety.

To this end, the invention relates to a chuck of the above-mentioned type, likewise comprising:

radial locking means which can be actuated by a rotation of the sleeve so that, when they are in the locked position, they inhibit rotation of the nut with respect to the body when the jaws are in the clamping position;

and axial locking means which can be actuated by an axial movement of the sleeve and are intended, when they are in the locked position, to prevent the radial locking means from being actuated.

According to a general definition of the invention, the chuck additionally includes sequencing means designed to prevent the axial locking means from passing into the locked position while the radial locking means are not in the locked position.

Thus, the axial locking system will only be able to be triggered if the radial locking system has already been triggered, and the disadvantages of the prior art are avoided.

DETAILED DESCRIPTION OF EMBODIMENTS

Figure 1:
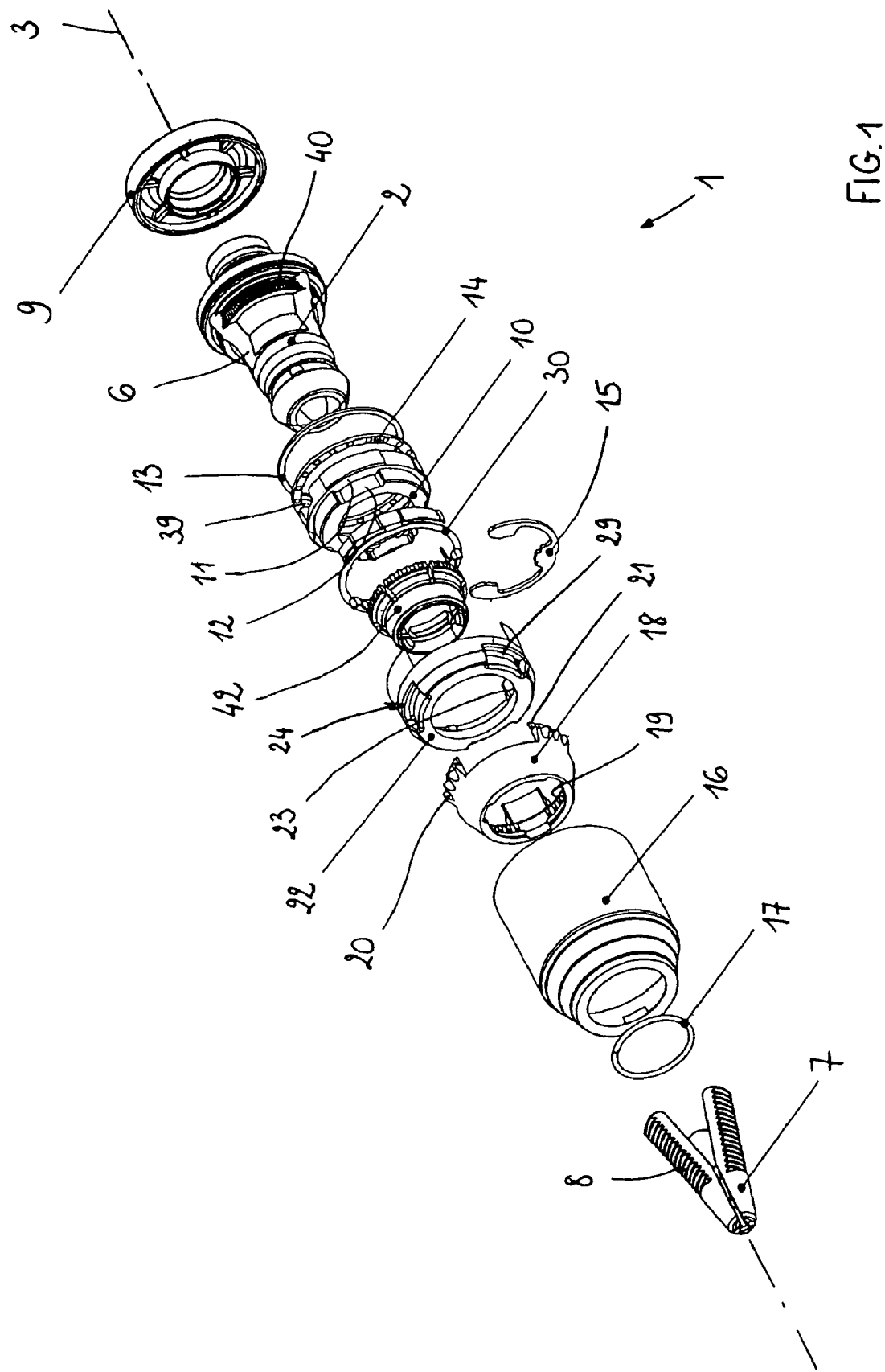
FIG. 1 is an exploded perspective view of a chuck according to the invention.
Figure 2:
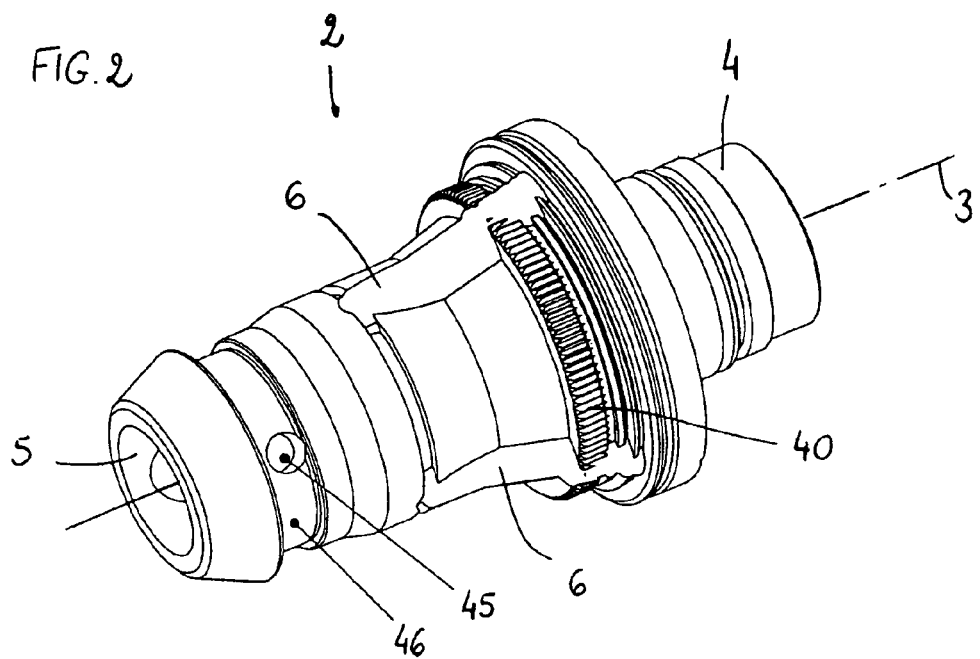
FIGS. 2, 3 and 4 are perspective views respectively showing the body, the clutch and the axial locking means of the chuck of FIG. 1.

According to one possible embodiment, the sleeve has an angular relative movement with respect to the nut between an unlocked position in which the sleeve can rotate the nut and a locked position in which the jaws are in the clamping position and the nut is inhibited from rotating with respect to the body, and the sequencing means comprise at least one stop member integral with the nut which, when the sleeve is in the unlocked position, is arranged in such a way as to prevent the axial movement of the sleeve and which, when the sleeve is in the locked position, is arranged in such a way as to allow the axial movement of the sleeve.

The operator is thus obliged to turn the sleeve towards its locked position, therefore carrying out radial locking in a first step before being able to move the sleeve axially in order to carry out axial locking of the chuck.

For example, the radial locking means comprise at least one spring blade mounted in an angularly fixed manner on the nut and having a free end which projects through a cutout formed in the nut and which, in the locked position of the radial locking means, cooperates with a peripheral splined region formed on the body.

The spring blade may be integral with a ring mounted fixedly on the nut, the said ring including at least two tabs engaged in peripheral notches formed in the nut which allow the ring to be immobilized rotationally with respect to the nut.

Advantageously, the stop member may consist of the free end of at least one tab, which projects from the nut in a substantially radially outward manner.

According to one possible embodiment, the axial locking means comprise a set of teeth formed on the inner face of the sleeve and a set of teeth formed on the outer face of the body, the sets of teeth being disunited in a first axial position of the sleeve and in engagement in a second axial position of the sleeve.

The chuck may additionally comprise:
an insert mounted fixedly inside the sleeve and including at least one axial tooth;
a driver having at least one slot receiving the axial tooth of the insert such that the driver can be rotated by the insert and have a degree of freedom to move with axial translation with respect to the insert, the driver having an angular relative movement with respect to the nut between an unlocked position in which the driver can rotate the nut and a locked position in which the jaws are in the clamping position and the nut is inhibited from rotating with respect to the body.

For example, the driver includes an axially and radially open aperture formed at the bottom of its slot, in which aperture is housed the stop member and in which aperture can be inserted a tenon which axially prolongs the tooth of the insert when the sleeve is in the locked position.

In one possible embodiment, the inner set of teeth is formed on the inner face of the insert.

The chuck may additionally include a clutch mounted fixedly on the body, and on which the outer set of teeth is formed.

A possible embodiment of the invention will now be described by way of non-limiting example with reference to the appended figures.

Reference will first of all be made to FIGS. 1 to 4.

The chuck 1 comprises a generally cylindrical body 2 having an axis 3. The rear part 4 of the body 2 comprises an orifice intended to allow the insertion of a spindle of a rotating machine such as a drill. The front part of the body 2 comprises a longitudinal bore 5 in which a tool such as a drill bit is intended to be inserted, and also three forward-converging housings 6 which each receive a jaw 7 and allow it to be guided translationally. The jaws 7 have an external thread 8.

The chuck 1 also comprises a substantially cylindrical rear ring 9 engaged around the rear part 4 of the body 2 in a substantially coaxial manner and secured to the said rear part by any suitable means.

A nut 10 is engaged around the jaws 7, substantially coaxially to the body 2. The nut 10 has an internal thread cooperating with the external thread 8 of the jaws 7 to allow movement of the jaws 7 towards the clamping or released position in the direction in which the nut 10 is rotated. The nut 10 is formed by a front cylindrical section and by a rear cylindrical section which both have the same inside diameter, the outside diameter of the rear section being greater than the outside diameter of the front section. The junction between the front and rear sections defines a transverse surface 11 orthogonal to the axis 3 of the body 2. The front section of the nut 10 comprises three substantially radial notches 12 which are equally distributed over its periphery.

Figure 5:
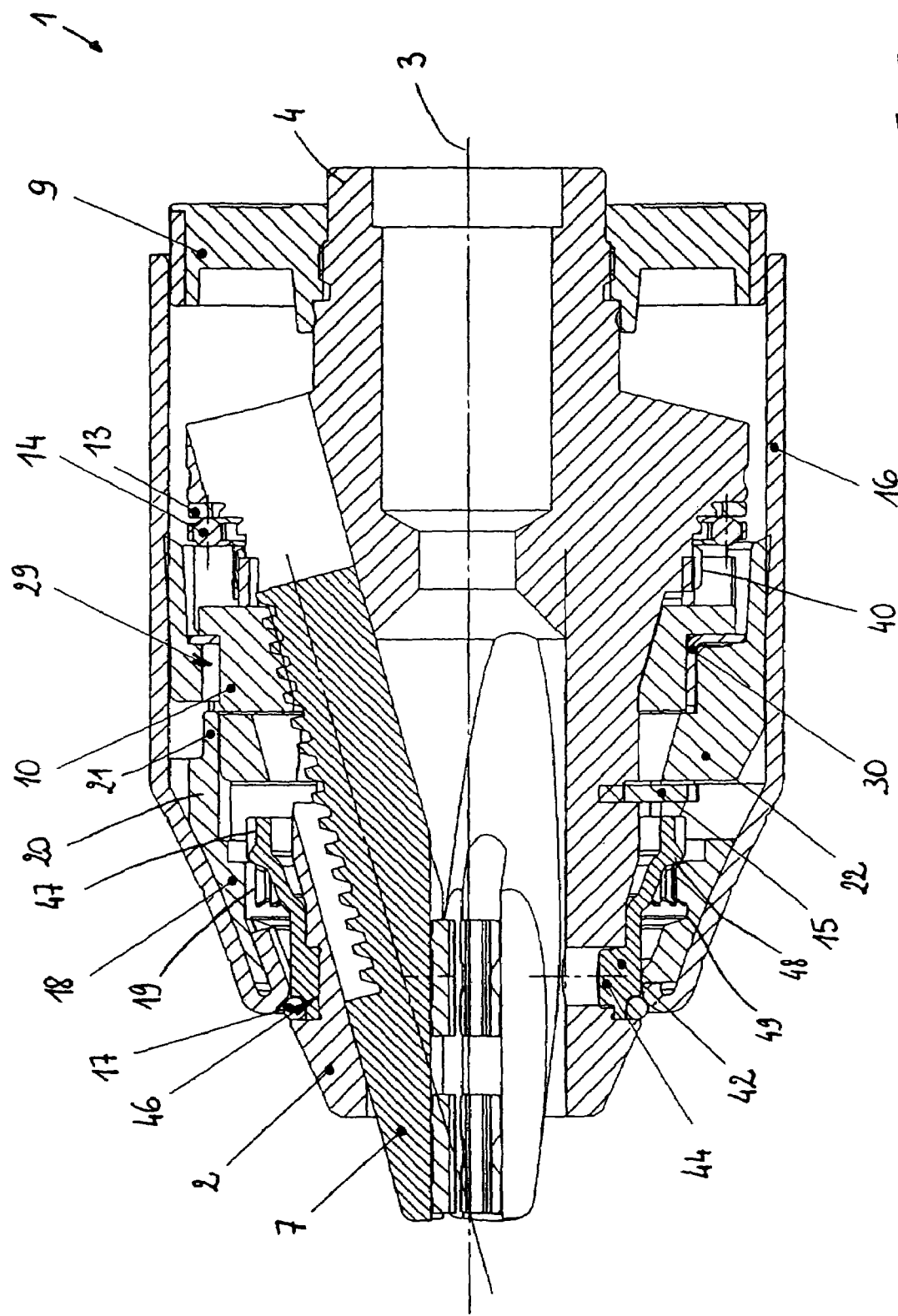
FIG. 5 is a view in longitudinal section of the chuck in the unlocked position.

The nut 10 is mounted to butt rearwardly against a transverse wall of the body 2 (see FIG. 5), with interposition of a steel washer 13 and of a ball cage 14 in order to facilitate the rotation of the nut 10 with respect to the body 2. Furthermore, a circlip 15 inhibits forward translational movement of the nut 10.

The chuck 1 also comprises a generally cylindrical sleeve 16 extending substantially over the whole length of the body 2. The sleeve 16 is mounted on the body 2 so that it can rotate about the axis 3, with a possibility of translational movement of limited amplitude along the axis 3. This movement is limited towards the front by a retaining ring 17 and towards the rear by various means which will be described at a later point. The inner wall of the sleeve 16 and also the various parts associated therewith cooperate with the nut 10 to allow the said nut 10 to be rotated and therefore allow the jaws 7 to be moved forwards or rearwards for the purpose of clamping or releasing the tool.

An insert 18 is arranged at the front inside the sleeve 16 in a fixed manner with respect to the said sleeve. In the case of a chuck 1 with a metal casing, the insert 18 is mounted in a fixed manner in the sleeve 16. In the case of a chuck 1 with a plastic casing, the insert 18 forms an integral part of the sleeve 16. At the same time as the sleeve 16, the insert 18 can therefore rotate with respect to the body 2 about the axis 3 and move translationally along the axis 3 with a limited amplitude.

The insert 18 has a generally frustoconical front part whose front end is engaged in a fold of the sleeve 16 and whose inner face comprises a substantially circular inner set of teeth 19. The insert 18 also includes, as a prolongation of the front part, three teeth 20 which extend axially rearwards and are equally distributed over the periphery of the insert 18. Each tooth 20 has a substantially rectangular shape in side view and is prolonged by a tenon 21 whose radial thickness is narrower than the tooth 20 itself. The tenons 21 substantially have the same inside diameter as the teeth 20.

A driver 22 is mounted on the body 2, inside the sleeve 16, wholly between the nut 10 and the insert 18, being inhibited in forward translational movement with respect to the body 2 by the circlip 15 and in rearward translational movement by the nut 10 butting against the transverse wall of the body 2. The insert 18 is therefore able to move translationally along the axis 3 with respect to the driver 22.

The driver 22 has the general shape of a cylinder. Provided on the inner face of the cylinder are three fingers 23 each engaged in a notch 12 of the nut 10 (see FIG. 7). Furthermore, three substantially equally distributed slots 24 which open to the front and radially outwardly are formed over the periphery of the cylinder. Each slot 24 is intended to receive one tooth 20 of the insert 18, with the result that the rotation of the insert 18 about the axis 3 caused by an operator actuating the sleeve 16 causes the driver 22 to rotate.

Figure 6:
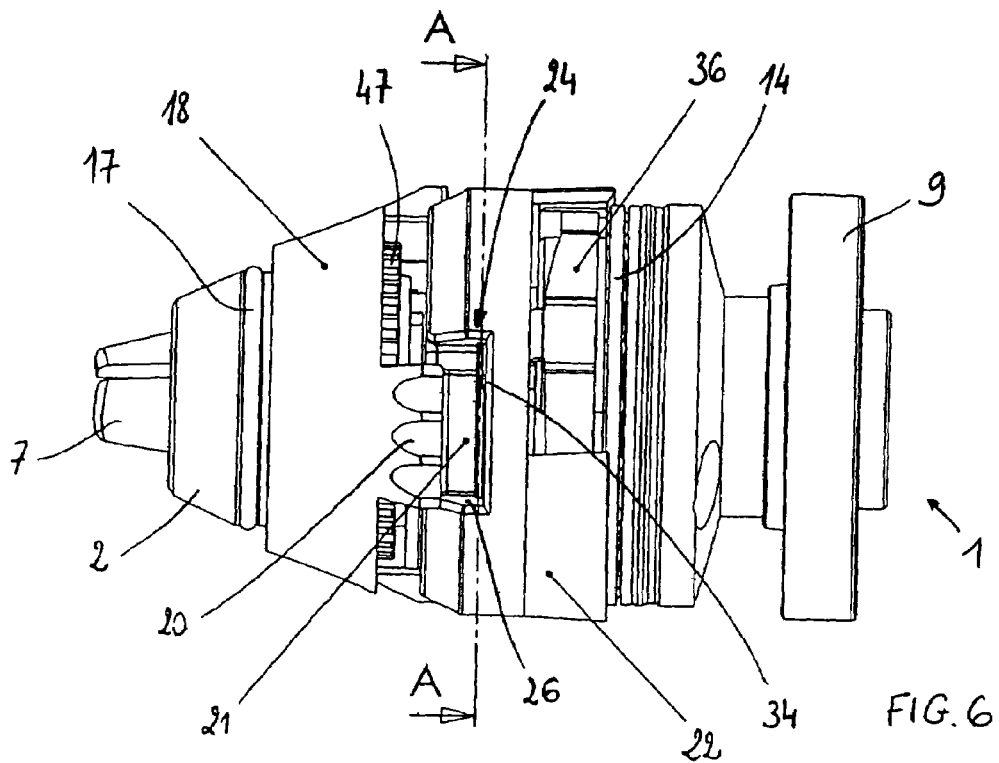
FIG. 6 is a side view of the chuck in the unlocked position.

Each slot 24 is bounded by a cylindrical face 25, two axially oriented lateral faces 26, 27, and an end wall 28 arranged transversely to the axis 3. It should be pointed out that the distance between the lateral faces, 26, 27 of a slot 24 is greater than the width of a tooth 20. Thus, when a tooth 20 is in contact with one 26 of the lateral faces of the driver 22, there is a space between this tooth 20 and the other 27 of the lateral faces (see FIG. 6).

Formed substantially at the junction between the cylindrical face 25 and the end wall 28 of a slot 24 is an axially and radially open aperture 29 whose radial dimension is substantially identical to the radial thickness of the tenon 21 which prolongs each tooth 20 of the insert 18. Each aperture 29 is thus intended to receive a tenon 21, as will be seen at a later point.

Radial locking means 30 are mounted on the nut 10, being interposed between the nut 10 and the driver 22.

Figure 4:
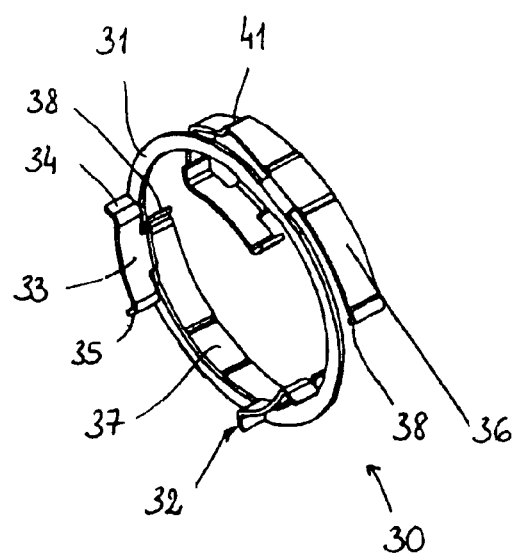
Figure 7:
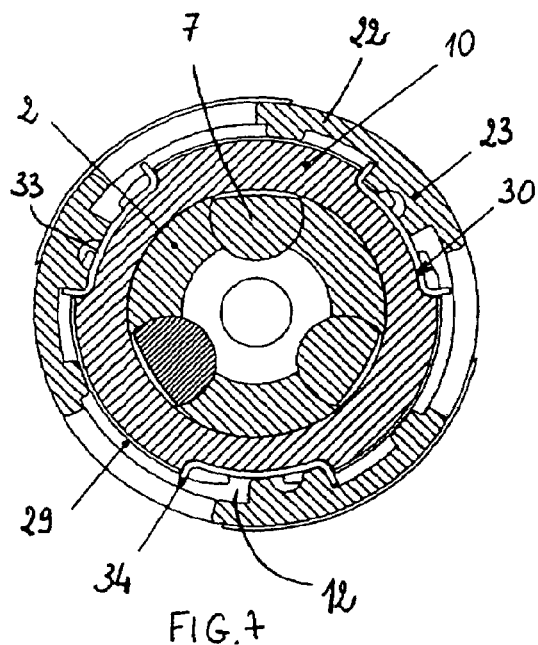
FIG. 7 is a sectional view of the chuck on line AA of FIG. 6.
Figure 8:
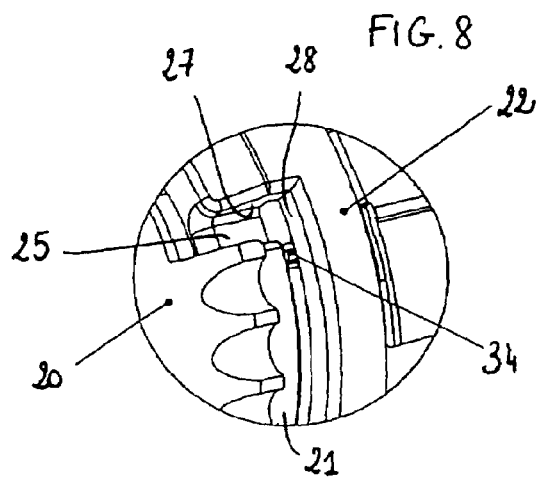
FIG. 8 is an enlarged perspective view of a detail of FIG. 6, showing the stop member preventing the axial movement of the sleeve.

As illustrated in FIG. 4, the radial locking means 30 comprise a ring 31 mounted on the nut 10 so as to rotate as one therewith, being mounted for example against the transverse surface 11 of the said nut. The ring 31 comprises three tabs 32 which extend radially to the inside of the ring 31 and to the front thereof. The tabs 32 are each engaged in a notch 12 of the nut 10 so as to allow the ring 31 to be rotationally immobilized with respect to the nut 10, the tabs 32 having a shape which matches the shape of the notches 12 of the nut 10. Thus, each tab 32 has a base 33 in the form of a cylinder portion which extends substantially transversely with respect to the plane of the ring 31, and also two folds 34, 35 extending from the base 33 in the direction of the outside of the ring 31. The folds 34, 35 cooperate with the lateral faces of the notches 12 and protrude beyond the cylindrical outer surface of the nut 10 (FIG. 7). In the mounted position, at least one of the folds 34 of each tab 32 projects radially through an aperture 29 formed in the slot 24 of the driver 22.

The fingers 23 of the driver 22 are therefore engaged in the notches 12 of the nut 10, at the bottom of which notches are arranged the tabs 32 of the radial locking means 30.

The ring 31 also comprises first and second spring blades 36, 37 in the form of a circular arc centred on the axis 3. The two spring blades 36, 37 extend oppositely to one another, to the rear of the ring 31, above the rear section of the nut 10. The free end 38 of each spring blade 36, 37 is curved in the direction of the axis 3 while projecting through a through-cutout 39 formed in the nut 10 in order, in the clamped position of the chuck 1, to reach a splined region 40 provided on the body 2. The first spring blade 36 additionally includes a relief 41 directed towards the outside of the chuck 1 in order to respectively cooperate in the locked and unlocked positions of the sleeve 16 with first and second depressions formed in the inner wall of the driver 22. Moreover, the driver 22 includes in its inner wall two cut-out parts terminated by a ramp and in which the free end 38 of a spring blade is housed when the sleeve 16 is in the unlocked position.

Finally, the chuck 1 includes a clutch 42 mounted fixedly on the body 2, in front of the latter.

Figure 3:
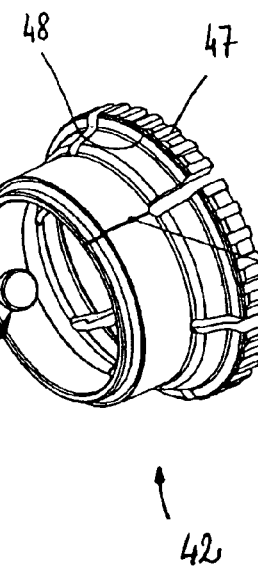

As illustrated in FIG. 3, the clutch 42 substantially has the shape of a cylinder provided with an axial slit 43 extending over its whole length and allowing it to be deformed radially in an elastic manner so that it can be mounted on the body 2. The clutch 42 additionally has at least one stud 44 intended to be engaged in a corresponding hole 45 formed in the body 2. The stud is in this case cylindrical, radial and directed towards the axis 3 and particularly inhibits rotation of the clutch 42 on the body 2. Advantageously, the hole 45 is pierced radially in a peripheral groove 46 of the body, this groove 46 enabling the clutch 42 to be held very securely in the axial position with respect to the body 2. The clutch 42 is retained in position on the body 2 by the sleeve 16 which covers the clutch 42 and which prevents radial deformation of the latter. Thus, the clutch 42 is completely immobilized on the body 2. The clutch 42 additionally includes an outer set of teeth 47 which is situated, when the sleeve 16 is butting on the front retaining ring 17, to the rear of the inner set of teeth 19 of the insert 18 (FIG. 3), and in line with the inner set of teeth 19 when the sleeve 16 is butting rearwardly. The sets of teeth 19, 47 belong to the axial locking means of the chuck 1.

The way in which the chuck operates is as follows.

Initially, when the jaws 7 are in the released position, the sleeve 16 is in the advanced position (butting against the front retaining ring 17). The inner set of teeth 19 of the insert 18 is therefore disunited from the outer set of teeth 47 of the clutch 42, in front of this latter set. The teeth 20 of the insert 18 are engaged in the slots 24 of the driver, but the tenons 21 are not inserted in the apertures 29.

An annular flange 48 formed on the clutch 42 just in front of the outer set of teeth 47 cooperates with the inclined rear face of the inner set of teeth 19 of the insert 18. Consequently, the sleeve 16 is retained in the front position.

For the purpose of clamping the chuck 1, an operator turns the sleeve 16 with respect to the body 2, and also therefore the insert 18 which is secured to the sleeve 16. As a result of cooperation between the teeth 20 of the insert 18 and the slots 24 of the driver 22, the driver 22 is also set in rotation. Consequently, since the relief 41 of the first spring blade 36 is engaged in the first depression formed in the inner wall of the driver 22, the radial locking means 30, and therefore the nut 10 to which they are fixed, are set in rotation. The jaws 7 are therefore moved forwards and brought closer to the axis 3. During this movement, the fingers 23 of the inner face of the driver 22 are in contact with a first lateral wall of the notch 12 of the nut 10 (FIG. 7). Moreover, the relative positioning of the various parts is designed so that one of the folds 34 of each tab 32 of the radial locking means 30 passes through the corresponding aperture 29.

The position of the various parts constituting the chuck 1 once the jaws 7 are in the tool-clamping position is illustrated in FIGS. 5 to 8.

The axial and radial locking means are in the unlocked position since:

- the fold 34 of the tab 32 of the radial locking means 30 prevents the rearward movement of the insert 18 with respect to the driver 22, and therefore the cooperation between the inner 19 and outer 47 sets of teeth;
- the spring blades 36, 37 are not urged towards the splined region 40 of the body 2, because they are housed in the cut-out parts formed in the inner wall of the driver 22.

Figure 11:
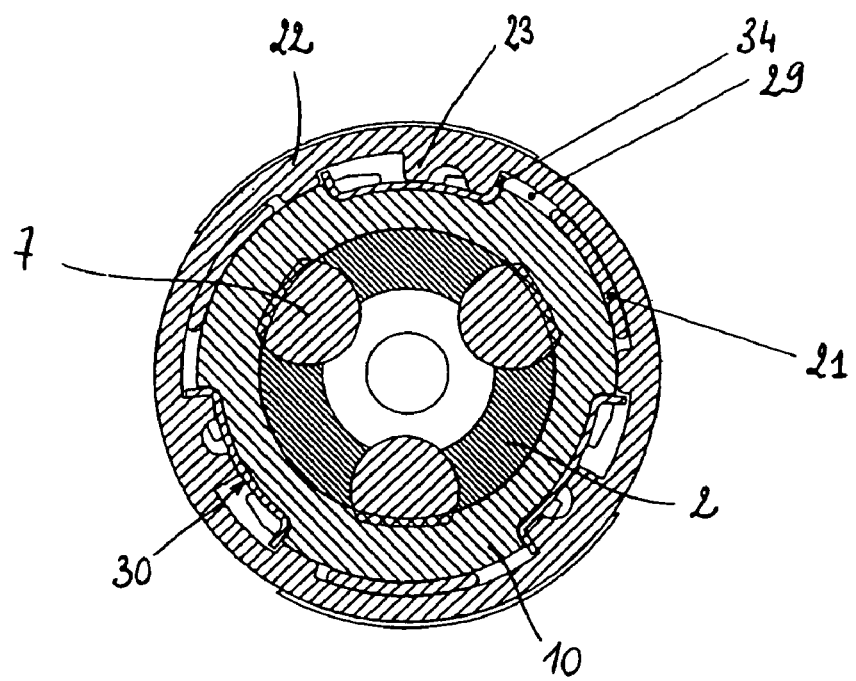
FIG. 11 is a sectional view of the chuck on line BB of FIG. 10.

Starting from this position, continuing to move the sleeve 16 rotationally causes the relative rotation of the driver 22 with respect to the nut 10, the fingers 23 of the inner face of the driver 22 moving so as to come into contact with the second lateral wall of the notch 12 of the nut 10 (FIG. 11).

The sleeve 16 and the driver 22 are then in the locking position. The relief 41 of the first spring blade 36 cooperates with the second depression formed in the inner wall of the driver 22, and the spring blades 36, 37, given that they are no longer housed in the cut-out parts formed in the inner wall of the driver 22, are urged towards the axis 3. Consequently, they cooperate with the splined region 40 of the body 2 and therefore inhibit rotation of the nut 10 with respect to the body 2. The driver 22 has therefore made it possible to trigger the axial locking means.

Furthermore, owing to the rotational movement of the driver 22 with respect to the nut 10, the fold 34 of each tab 32 of the radial locking means 30 has moved with respect to the aperture 29 and becomes housed in the vicinity of the lateral face 27 of the slot 24, thereby freeing the axial passage of the corresponding aperture 29.

Figure 9:
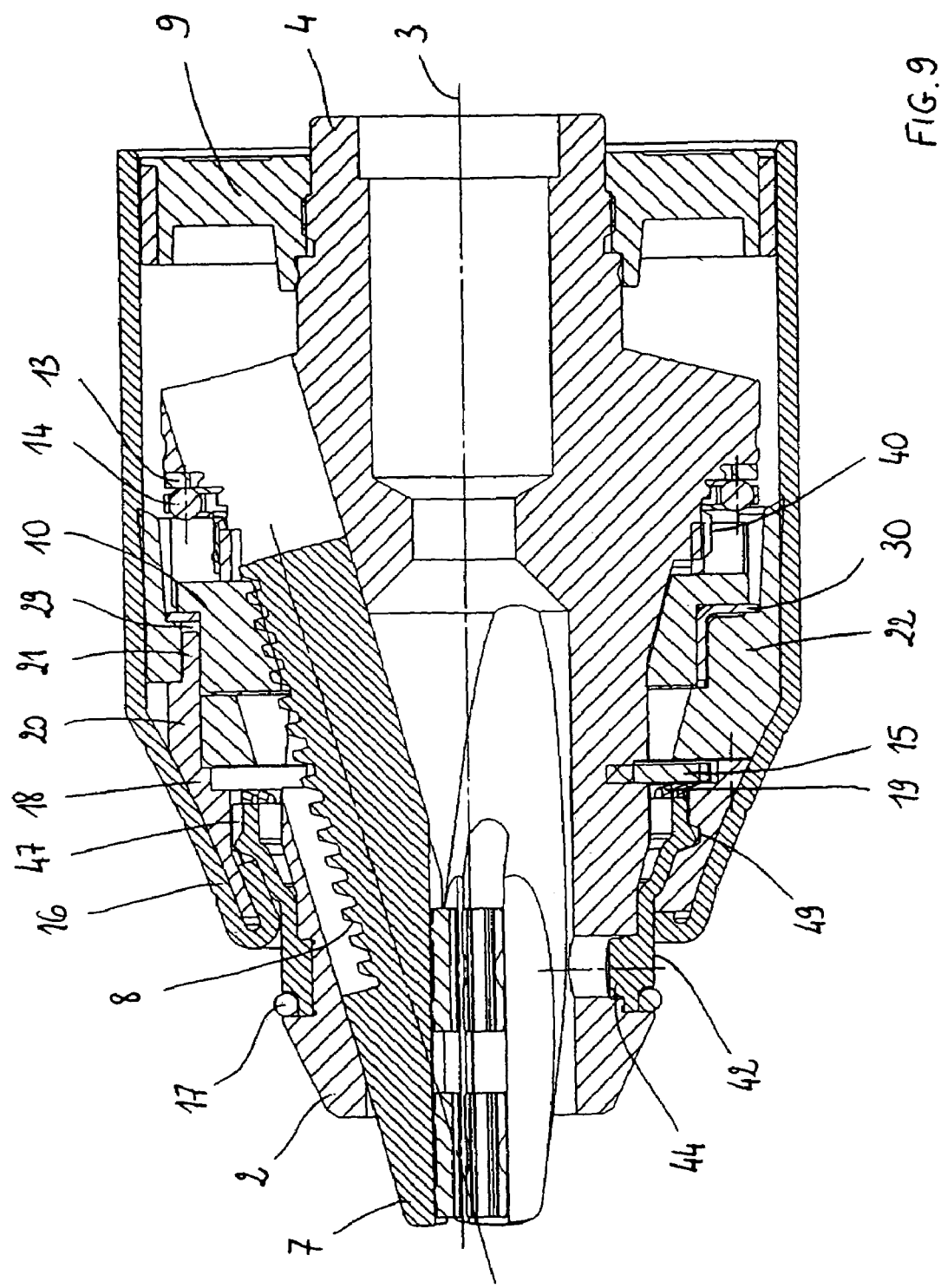
FIG. 9 is a view in longitudinal section of the chuck in the locked position.
Figure 10:
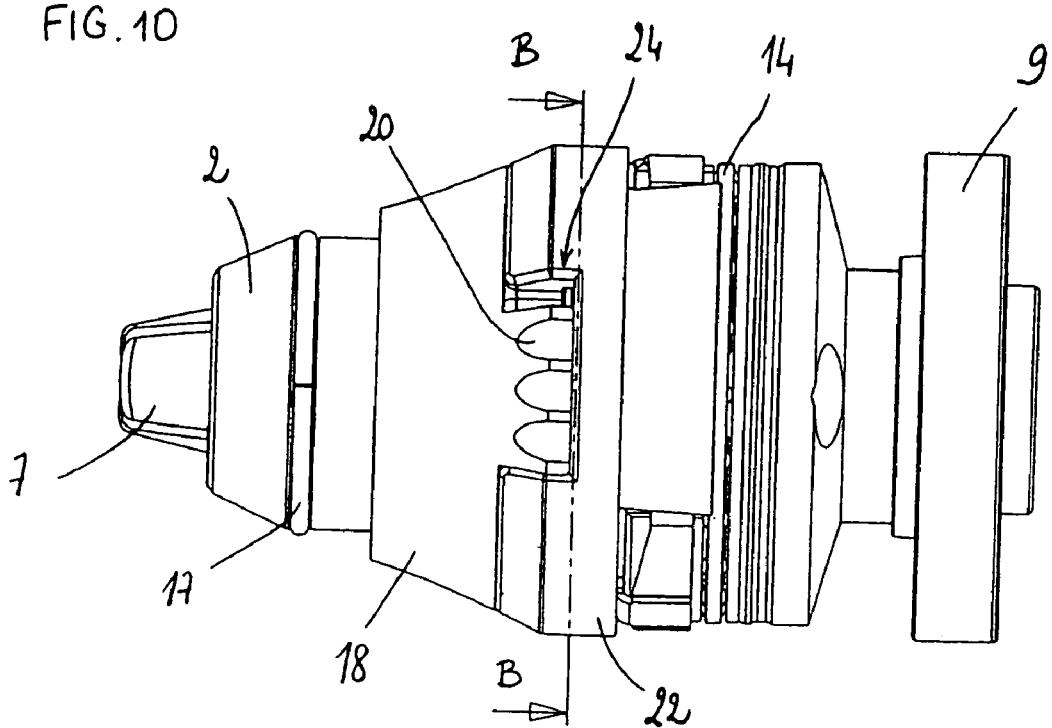
FIG. 10 is a side view of the chuck in the locked position.

The operator can therefore move the assembly formed by the sleeve 16 and insert 18 along the axis 3, with respect to the body 2 and rearwardly, by exerting a slight force so that the set of teeth 19 of the insert 18 can pass beyond the annular flange 48. The tenons 21 prolonging the tooth 20 of the insert 18 then engage in the apertures 29, and the inner set of teeth 19 of the insert 18 engages with the outer set of teeth 47 of the clutch 42 (FIGS. 9 to 11). The axial locking means are then in the locked position: in this position, they prevent the sleeve 16 from rotating with respect to the body 2 and therefore prevent the chuck 1 from unlocking.

The rearward limitation of the translational movement of the sleeve 16 is provided by the transverse face formed between the finger 20 and the tenon 21 of the insert 18 coming into butting contact with the end wall 28 of the slot 24 of the driver 22. The sleeve 16 can be blocked in the rear position by latching an element of the sleeve 16 or of the insert 18 into a groove forming part of the body 2, this action additionally producing a characteristic noise which can be discerned by the operator. For example, the insert 18 includes a groove 49 whose shape is adapted to the shape of the annular flange 48 formed on the clutch 42, being substantially trapezoidal in this case, the said annular flange 48 becoming housed in this groove (see FIG. 9).

To release the jaws 7, the operator must first of all unlock the axial locking means by moving the sleeve 16 towards the front. The operator can then turn the sleeve 16 in the reverse direction about the axis 3 to place the radial locking means in the unlocked position and then proceed with releasing the jaws 7.

Thus, the invention brings a decisive improvement to the prior art, providing a chuck which has means acting as an error-preventing device to prevent the operator from actuating the axial locking means first. The locking and the safety of the chuck are thus also improved as a result.

It goes without saying that the invention is not restricted to the embodiment described above by way of example but that, on the contrary, it encompasses all the variant embodiments thereof.

What is claimed is:

1. Tool-holding chuck for equipping a rotating machine, comprising:
    a body having an axis and including a rear part intended to be fixed to a driver shaft of the machine and a front part in which forward-converging housings are formed;
    jaws each mounted slidably in a housing of the body and having an external thread;
    a nut mounted to rotate on the body and having an internal thread engaged with the external thread of the jaws;
    a sleeve having an inner wall which cooperates with the nut so as to rotate it with respect to the body and thus move the jaws between a tool-clamping position and a released position;
    radial locking means which can be actuated by a rotation of the sleeve so that, when they are in a locked position, they inhibit rotation of the nut with respect to the body when the jaws are in the clamping position;
    axial locking means which can be actuated by an axial movement of the sleeve and are intended, when they are in a locked position, to prevent the radial locking means from being actuated,
        wherein the chuck additionally comprises sequencing means designed to prevent the axial locking means from passing into the locked position while the radial locking means are not in the locked position.

2. Chuck according to claim 1, wherein the sleeve has an angular relative movement with respect to the nut between an unlocked position in which the sleeve can rotate the nut and a locked position in which the jaws are in the clamping position and the nut is inhibited from rotating with respect to the body, and in that the sequencing means comprise at least one stop member integral with the nut which, when the sleeve is in the unlocked position, is arranged in such a way as to prevent the axial movement of the sleeve and which, when the sleeve is in the locked position, is arranged in such a way as to allow the axial movement of the sleeve.

3. Chuck according to claim 2, wherein the radial locking means comprise at least one spring blade mounted in an angularly fixed manner on the nut and having a free end which projects through a cutout formed in the nut and which, in the locked position of the radial locking means, cooperates with a peripheral splined region formed on the body.

4. Chuck according to claim 3, wherein the spring blade is integral with a ring mounted fixedly on the nut, the ring including at least two tabs engaged in peripheral notches formed in the nut which allow the ring to be immobilized rotationally with respect to the nut.

5. Chuck according to claim 3, wherein the stop member comprises a free end of at least one tab, which projects from the nut in a substantially radially outward manner.

6. Chuck according to claim 2, wherein the stop member comprises a free end of at least one tab, which projects from the nut in a substantially radially outward manner.

7. Chuck according to claim 2, wherein the chuck further comprises:
    an insert mounted fixedly inside the sleeve and including at least one axial tooth;
    a driver having at least one slot receiving the axial tooth of the insert such that the driver can be rotated by the insert and have a degree of freedom to move with axial translation with respect to the insert, the driver having an angular relative movement with respect to the nut between an unlocked position in which the driver can rotate the nut and a locked position in which the jaws are in the clamping position and the nut is inhibited from rotating with respect to the body.

8. Chuck according to claim 7, wherein the driver includes an axially and radially open aperture formed at the bottom of its slot, in which aperture is housed the stop member and in which aperture can be inserted a tenon which axially prolongs the tooth of the insert when the sleeve is in the locked position.

9. Chuck according to claim 1, wherein the radial locking means comprise at least one spring blade mounted in an angularly fixed manner on the nut and having a free end which projects through a cutout formed in the nut and which, in the locked position of the radial locking means, cooperates with a peripheral splined region formed on the body.

10. Chuck according to claim 9, wherein the spring blade is integral with a ring mounted fixedly on the nut, the ring including at least two tabs engaged in peripheral notches formed in the nut which allow the ring to be immobilized rotationally with respect to the nut.

11. Chuck according to claim 1, wherein the axial locking means comprises a set of teeth formed on the inner face of the sleeve and a set of teeth formed on the outer face of the body, the sets of teeth being disunited in a first axial position of the sleeve and in engagement in a second axial position of the sleeve.

12. Chuck according to claim 11, wherein an inner set of teeth is formed on the inner face of an insert.

13. Chuck according to claim 11, wherein the chuck further comprises a clutch mounted fixedly on the body, and on which an outer set of teeth is formed.

14. Chuck according to claim 13, wherein the clutch substantially has the shape of a cylinder provided with an axial slit extending over its whole length and enabling it to be deformed radially in an elastic manner for the purpose of mounting it on the body, the clutch additionally having at least one stud intended to be engaged in a corresponding hole formed in the body.

15. Chuck according to claim 1, wherein the chuck further comprises:
    an insert mounted fixedly inside the sleeve and including at least one axial tooth;
    a driver having at least one slot receiving the axial tooth of the insert such that the driver can be rotated by the insert and have a degree of freedom to move with axial translation with respect to the insert, the driver having an angular relative movement with respect to the nut between an unlocked position in which the driver can rotate the nut and a locked position in which the jaws are in the clamping position and the nut is inhibited from rotating with respect to the body.

16. Tool-holding chuck for equipping a rotating machine, comprising:
   a body having an axis and including a rear part intended to be fixed to a driver shaft of the machine and a front part in which forward-converging housings are formed;
   jaws each mounted slidably in a housing of the body and having an external thread;
   a nut mounted to rotate on the body and having an internal thread engaged with the external thread of the jaws;
   a sleeve having an inner wall which cooperates with the nut so as to rotate it with respect to the body and thus move the jaws between a tool-clamping position and a released position;
   radial locking parts which can be actuated by a rotation of the sleeve so that, when they are in a locked position, they inhibit rotation of the nut with respect to the body when the jaws are in the clamping position;
   axial locking parts which can be actuated by an axial movement of the sleeve and are intended, when they are in a locked position, to prevent the radial locking parts from being actuated,
   wherein the chuck additionally comprises a sequencing system that prevents the axial locking parts from passing into the locked position while the radial locking parts are not in the locked position.

17. Chuck according to claim 16, wherein the sleeve has an angular relative movement with respect to the nut between an unlocked position in which the sleeve can rotate the nut and a locked position in which the jaws are in the clamping position and the nut is inhibited from rotating with respect to the body, and in that the sequencing system comprises at least one stop member integral with the nut which, when the sleeve is in the unlocked position, is arranged in such a way as to prevent the axial movement of the sleeve and which, when the sleeve is in the locked position, is arranged in such a way as to allow the axial movement of the sleeve.

* * * * *